United States Patent
Adupa et al.

(10) Patent No.: US 12,189,621 B1
(45) Date of Patent: Jan. 7, 2025

(54) SYSTEM FOR ENHANCED DATA PRE-AGGREGATION

(71) Applicant: Planful, Inc., Redwood City, CA (US)

(72) Inventors: Tarun Adupa, Hyderabad (IN); Abdul Hamed Mohammed, Redwood City, CA (US); Sanjay Vyas, Fremont, CA (US)

(73) Assignee: Planful, Inc., San Francisco, CA (US)

( * ) Notice: Subject to any disclaimer, the term of this patent is extended or adjusted under 35 U.S.C. 154(b) by 45 days.

(21) Appl. No.: 18/107,975

(22) Filed: Feb. 9, 2023

(51) Int. Cl.
*G06F 16/2453* (2019.01)
*G06F 9/46* (2006.01)
*G06F 9/50* (2006.01)
*G06F 16/28* (2019.01)

(52) U.S. Cl.
CPC ........ *G06F 16/24537* (2019.01); *G06F 9/466* (2013.01); *G06F 9/5016* (2013.01); *G06F 16/283* (2019.01)

(58) Field of Classification Search
CPC .. G06F 16/24537; G06F 9/466; G06F 9/5016; G06F 16/283
See application file for complete search history.

(56) References Cited

U.S. PATENT DOCUMENTS

| | | | |
|---|---|---|---|
| 2009/0132534 A1* | 5/2009 | Yao | G06F 16/275 |
| 2009/0172689 A1* | 7/2009 | Bobak | G06F 9/5061 |
| | | | 718/104 |
| 2014/0188906 A1* | 7/2014 | Muller | G06F 16/2282 |
| | | | 707/752 |
| 2022/0155972 A1* | 5/2022 | Edara | G06F 3/065 |
| 2023/0297436 A1* | 9/2023 | Palukuri | G06F 9/5061 |
| | | | 709/201 |

* cited by examiner

*Primary Examiner* — Mark D Featherstone
*Assistant Examiner* — Kweku William Halm
(74) *Attorney, Agent, or Firm* — Adibi IP Group, PC; Amir V. Adibi; Andrew C. Palmer

(57) ABSTRACT

A system for enhanced data pre-aggregation is provided. In one embodiment, a method is provided that includes receiving data formatted in a key/subkey format and distributing a data batch of the data to a plurality of processing threads. Each processing thread performs operations of: performing a first pass on the data batch to determine subkey rollup data; performing a second pass on the data batch to determine key rollup data; and storing the subkey rollup data and the key rollup data into data blocks. The method also includes outputting the data blocks to form a pre-aggregated data cube.

4 Claims, 11 Drawing Sheets

METHOD FOR PRE-AGGREGATING VALUE DIMENSIONS

PRE-AGGREGATION ARCHITECTURE

K2S LEAF DATA

AGGREGATION PROCESSING THREAD APPARATUS

METHOD FOR PRE-AGGREGATING VALUE DIMENSIONS

METHOD FOR SUB-KEY ROLL-UP

FIRST PASS AGGREGATION EXAMPLE

METHOD FOR KEY ROLL-UP

SECOND PASS AGGREGATION
EXAMPLE

902 SAMPLE DATA

| CITY-S | TYPE-A | Q1-20 | PRCD | 20 |
|---|---|---|---|---|

904 ROLLUP KEYS

| | | | | | | | VALUE | DIM. | LVL |
|---|---|---|---|---|---|---|---|---|---|
| CITY-S | TYPE-A | Q1-20 | PRCD | STATE1 | TYPE-A | Q1-20 | PRCD 20 | BRANCH | 48 |
| | | | | CITY-S | LAPTOPS | Q1-20 | PRCD 20 | PRODUCT | 54 |
| | | | | CITY-S | TYPE-A | 2020 | PRCD 20 | YEAR | 48 |
| | | | | CITY-S | TYPE-A | Q1-20 | UNITS 20 | UNITS | 36 |

906 SAMPLE DATA

| CITY-S | TYPE-A | Q1-20 | SOLD | 10 |
|---|---|---|---|---|

908 ROLLUP KEYS

| | | | | | | | VALUE | DIM. | LVL |
|---|---|---|---|---|---|---|---|---|---|
| CITY-S | TYPE-A | Q1-20 | SOLD | STATE1 | TYPE-A | Q1-20 | SOLD 20 | BRANCH | 48 |
| | | | | CITY-S | LAPTOPS | Q1-20 | SOLD 20 | PRODUCT | 54 |
| | | | | CITY-S | TYPE-A | 2020 | SOLD 20 | YEAR | 48 |
| | | | | CITY-S | TYPE-A | Q1-20 | UNITS 20-10=10 | UNITS | 36 |

910 SAMPLE DATA

| CITY-S | LAPTOPS | Q1-20 | UNITS |
|---|---|---|---|

910 ROLLUP KEYS

| | | | | LEVEL | VALUE | |
|---|---|---|---|---|---|---|
| CITY-S | TYPE-A | Q1-20 | UNITS | 36 | 10 | |
| CITY-S | TYPE-B | Q1-20 | UNITS | 36 | 5 | 10+5=15 |
| CITY-S | LAPTOPS | Q1-20 | PRCD | 54 | 30 | |
| CITY-S | LAPTOPS | Q1-20 | SOLD | 54 | 15 | 30+(-15)=15 |

SECOND PASS AGGREGATION EXAMPLE

FIG. 9

PRE-AGGREGATION FUNCTIONAL DIAGRAM

PRE-AGGREGATION PERFORMANCE IMPROVEMENTS
OVER CONVENTIONAL SYSTEM

SYSTEM FOR ENHANCED DATA PRE-AGGREGATION

TECHNICAL FIELD

The present invention relates generally to database management systems, and more specifically, to a system for enhanced data pre-aggregation.

BACKGROUND INFORMATION

Multidimensional analysis usually requires extremely high response efficiency. When the amount of data involved is large, the performance will be very low if aggregating from detailed data. To address this problem, pre-aggregation is used to speed up query responses. For example, pre-aggregation operates to calculate the results to be queried in advance and the pre-aggregated results are read directly at the time of use. However, it would be unrealistic if all possible dimension combinations were pre-aggregated, as this would require excessively large storage capacity.

SUMMARY

In various exemplary embodiments, a system for enhanced pre-aggregation is provided. In one embodiment, the system provides improvements in multiple operations of a data pre-aggregation process to achieve an overall increase in speed with higher throughput. Enhancements to the pre-aggregation process include utilizing a dynamic batch size, performing parallel thread processing, reducing computations while aggregating key rollup blocks, and reducing database calls to form the pre-aggregated data output.

In one embodiment, a method is provided that includes receiving data formatted in a key/subkey format and distributing a data batch of the data to a plurality of processing threads. Each processing thread performs operations of: performing a first pass on the data batch to determine subkey rollup data; performing a second pass on the data batch to determine key rollup data; and storing the subkey rollup data and the key rollup data into data blocks. The method also includes outputting the data blocks to form a pre-aggregated data cube.

In one embodiment, an apparatus is provided that is configured to pre-aggregate data. The apparatus comprises an input interface to receive the data that is formatted in key/subkey format, and a processor that processes a data batch of the data using a plurality of processing threads. Each processing thread performs operations of: performing a first pass on the data batch to determine subkey rollup data; performing a second pass on the data batch to determine key rollup data; and storing the subkey rollup data and the key rollup data into data blocks. The apparatus also comprises an output memory for outputting the data blocks to form a pre-aggregated data cube.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIGS. 8-9 show diagrams that illustrate the operations of the method shown in FIG. 7.

DETAILED DESCRIPTION

Reference will now be made in detail to some embodiments of the invention, examples of which are illustrated in the accompanying drawings.

Figure 1:
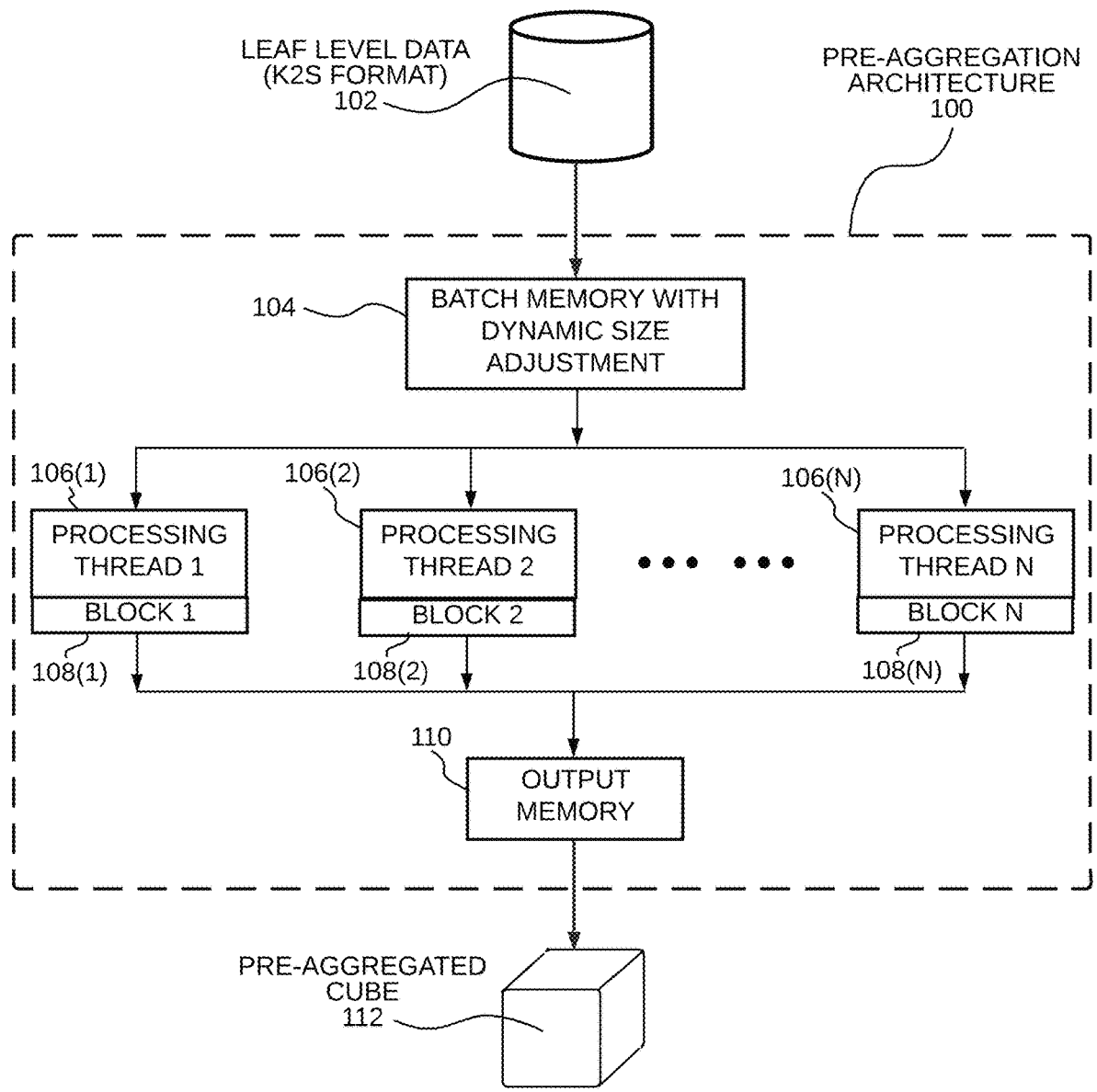
FIG. 1 shows a diagram of pre-aggregation architecture in accordance with one aspect.

FIG. 1 shows a diagram of pre-aggregation architecture 100 in accordance with one aspect. The pre-aggregation architecture 100 pre-aggregates leaf level data in Key/Subkey format to generate a multidimensional cube to provide speed of thought and sub-millisecond query response to users who are slicing and dicing the cube using Zoom In, Zoom Out, Pivot, or any other data exploratory actions.

In various embodiments, the architecture 100 receives data 102 that is formatted in a Key/Subkey format. For example, all tuples of the leaf-level data 102 are stored using a Key, Key, Subkey (K2S) format.

A batch memory 104 receives and stores batches of the data 102 using a dynamically adjusted batch size and divides each batch of data to provide to multiple processing threads 106 (1-N).

The processing threads 106 (1-N) perform a two-pass aggregation algorithm to aggregate the data they receive to generate aggregated blocks 108 (1-N). The processing threads 106 (1-N) operate in parallel so as to increase the pre-aggregation speed and reduce calculation run times, thereby improving the overall system performance.

After the processing threads 106 (1-N) have completed aggregation of their respective data, all the generated data blocks 108 (1-N) are transferred to an output memory 110. Additional batches having a dynamically adjusted batch size are aggregated by the processing threads until all the data has been processed. The output memory 110 then outputs its stored data as a pre-aggregated cube 112.

In one embodiment, the pre-aggregation architecture 100 performs batch size optimization to dynamically adjust the data batch sizes. Additionally, architecture 100 also performs database optimization. For example, when aggregating key blocks, the optimization algorithm finds the child keys in a batch until the child keys size equals the dynamic batch size. Then, all blocks are fetched at once to reduce the database calls. A more detailed description of the structure and operations of the pre-aggregation architecture 100 is provided below.

Figure 2:
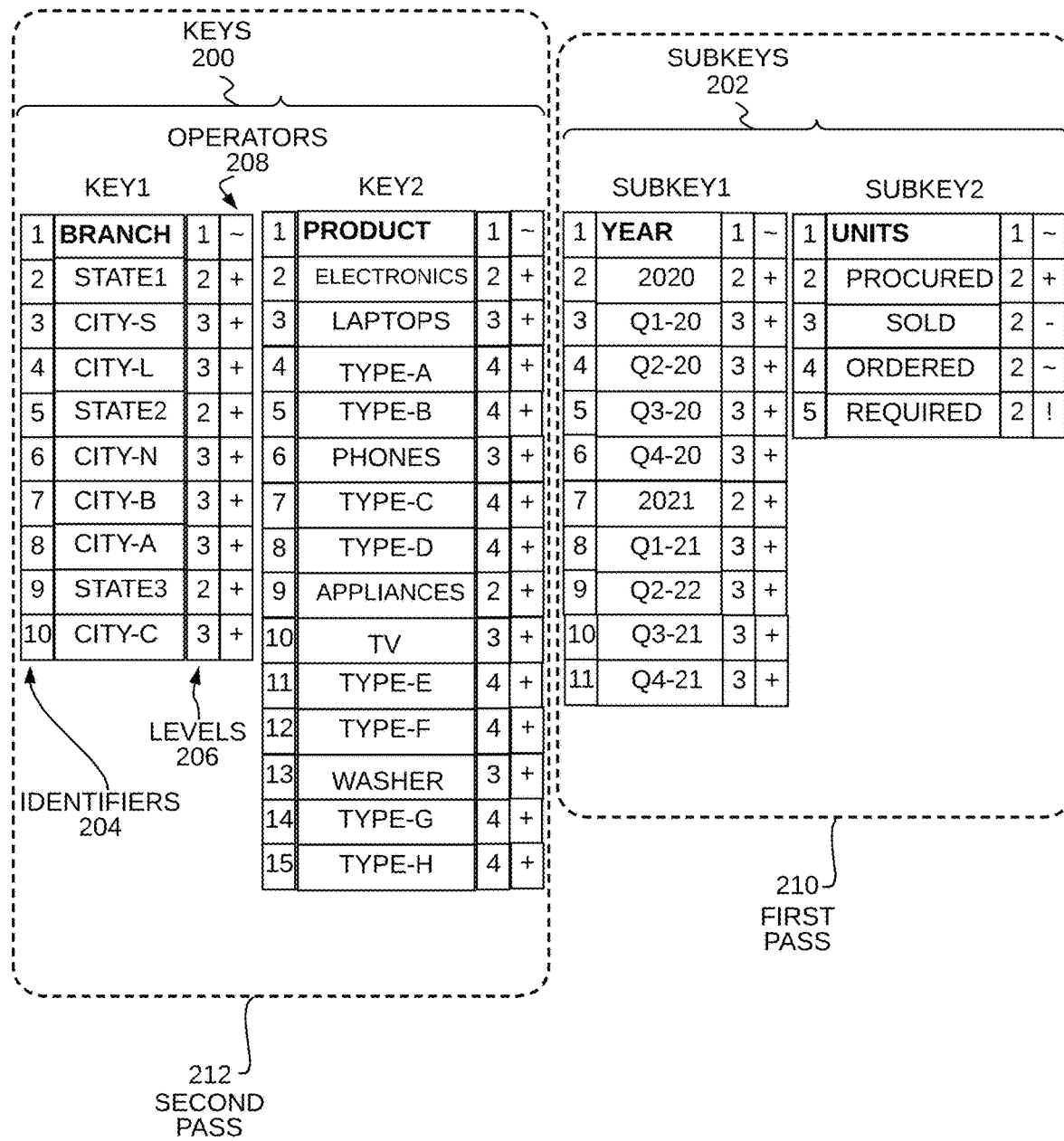
FIG. 2 shows an example of data organized in key/subkey format.

FIG. 2 shows an example of data organized in K2S format. For example, the data includes two key dimensions 200 (e.g., key1 and key2) and two subkey dimensions (e.g., subkey1 and subkey2). The key1 dimension includes 10 identifiers 204 organized in 3 levels 206 and includes roll-up operators 208. The key2 dimension includes 15 identifiers organized in 4 levels with associated roll-up operations. The subkey1 dimension includes 11 identifiers organized in 3 levels with associated roll-up operators, and the subkey2 dimension includes 5 identifiers organized in 2 levels with roll-up operators. Thus, the data shown in FIG. 2 is formatted in a K2S format that includes two keys having associated subkeys.

During operation of the aggregation architecture 100, the processing threads 106 (1-N) perform aggregation of the data in two passes. In a first pass 210, the subkey data is aggregated into subkey blocks, and in a second pass 212, the key data is aggregated into key blocks. A more detailed description of the aggregation process performed by the processing threads 106 (1-N) is provided below.

Figure 3:
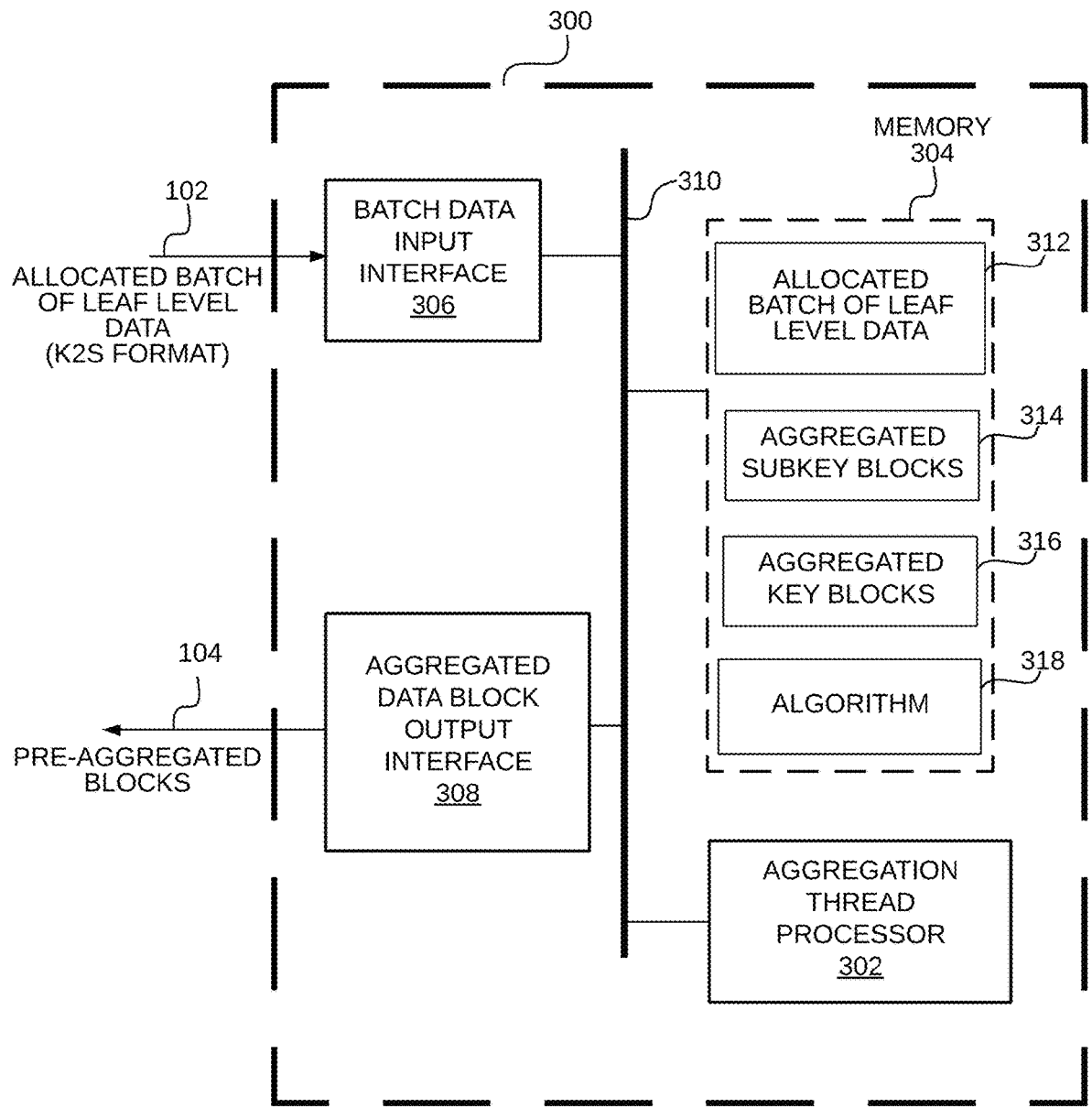
FIG. 3 shows an exemplary aggregation processing apparatus in accordance with one aspect.

FIG. 3 shows an exemplary aggregation processing apparatus 300 in accordance with one aspect. For example, the apparatus 300 is suitable for use as any of the aggregation processing threads 106 (1-N) shown in FIG. 1.

The apparatus 300 comprises aggregation thread processor 302, memory 304, batch data input interface 306, and aggregated data block output interface 308, all connected to communicate over bus 310.

During operation, leaf level data 102 is received by the batch data input interface 306, which stores the received data into the memory 304 as an allocated batch of leaf level data 312. The aggregation thread processor 302 executes the algorithm 138 to aggregate the data 312 in two passes. In a first pass, the processor 302 aggregates subkeys and then stores this aggregation in the memory 304 as aggregated subkey blocks 314. In a second pass, the processor 302 aggregates the keys in a bottom-up manner from leaf level up to the root and stores this aggregation as aggregated key blocks 316.

A bottom-up approach is used for aggregation starting from the leaf keys. The parent keys are extracted, stored, and processed level-wise. To compute the value of a rollup key, all the child keys for that key are extracted and the values are added based on the corresponding roll-up operator. The process of finding the parent keys and computing their values is repeated until the root key is reached. The key blocks are aggregated and then stored in the memory 304 as aggregated key blocks 316.

Figure 4:
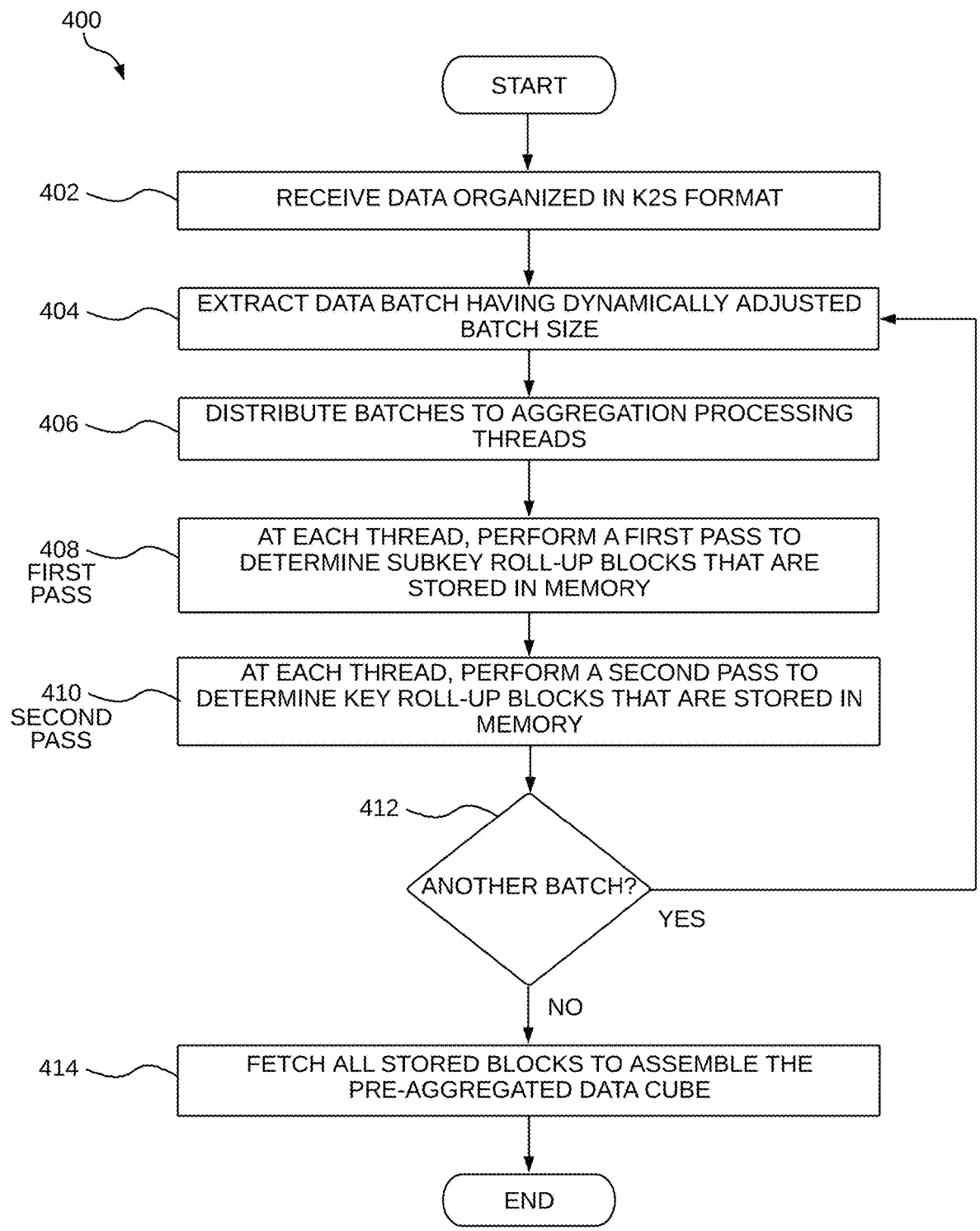
FIG. 4 is a flowchart of a method for aggregation processing in accordance with one aspect.

FIG. 4 is a flowchart of a method 400 for aggregation processing in accordance with one aspect. For example, in one embodiment, method 400 is performed by the aggregation processing architecture 100 shown in FIG. 1. Due to the configuration of multiple processing threads, method 400 operates to increase aggregation speed and reduce calculation run times thereby improving overall system performance.

At block 402, data is received that is organized in a K2S format.

At block 404, data batches are extracted that have a dynamically adjusted batch size. In one embodiment, the batch size is dynamically adjusted based on the amount of memory allocated to the process, the number of parallel threads, and the average block size. In another embodiment, the batch size is selected according to the following expression:

$$\text{Batch Size} = \text{Min}[1000, (\text{Memory})/(\text{Avg Document Size})*(\text{No. Threads})]$$

At block 406, the data batches are distributed to a plurality of aggregation processing threads. For example, in FIG. 1, the data batches are distributed to the processing threads 106 (1-N).

At block 408, a first pass is performed at each thread to parallelly process a batch to determine subkey roll-up blocks that are stored in memory. This improves the parallelism as larger subtasks are provided to each thread. A common fork join pool is used for processing the data blocks parallelly read.

At block 410, a second pass is performed at each thread to determine key roll-up blocks that are stored in memory.

At block 412, a determination is made as to whether more data batches are to be processed. If more data batches are to be processed, the method proceeds to block 404. If no more data batches are to be processed, the method proceeds to block 414.

At block 414, all stored blocks are fetched to assemble the pre-aggregated data cube 112. For example, the aggregated blocks are bundled into batches before being written to memory, and the batches of blocks are retrieved from the memory to assemble the data cube. In various embodiments, stored blocks are fetched all at once, simultaneously, or sequentially to assemble the pre-aggregated data cube 112.

In one embodiment, a task only splits itself up into subtasks if the work given is large enough for it to make sense. There is overhead when splitting up a task into subtasks, so for lesser amounts of work, this overhead may be greater than the speedup achieved by executing subtasks concurrently.

Thus, method 400 operates to provide data pre-aggregation in accordance with one aspect. It should be noted that the operations of method 400 can be updated, deleted, added to, rearranged, or otherwise modified within the scope of the embodiments.

Figure 5:
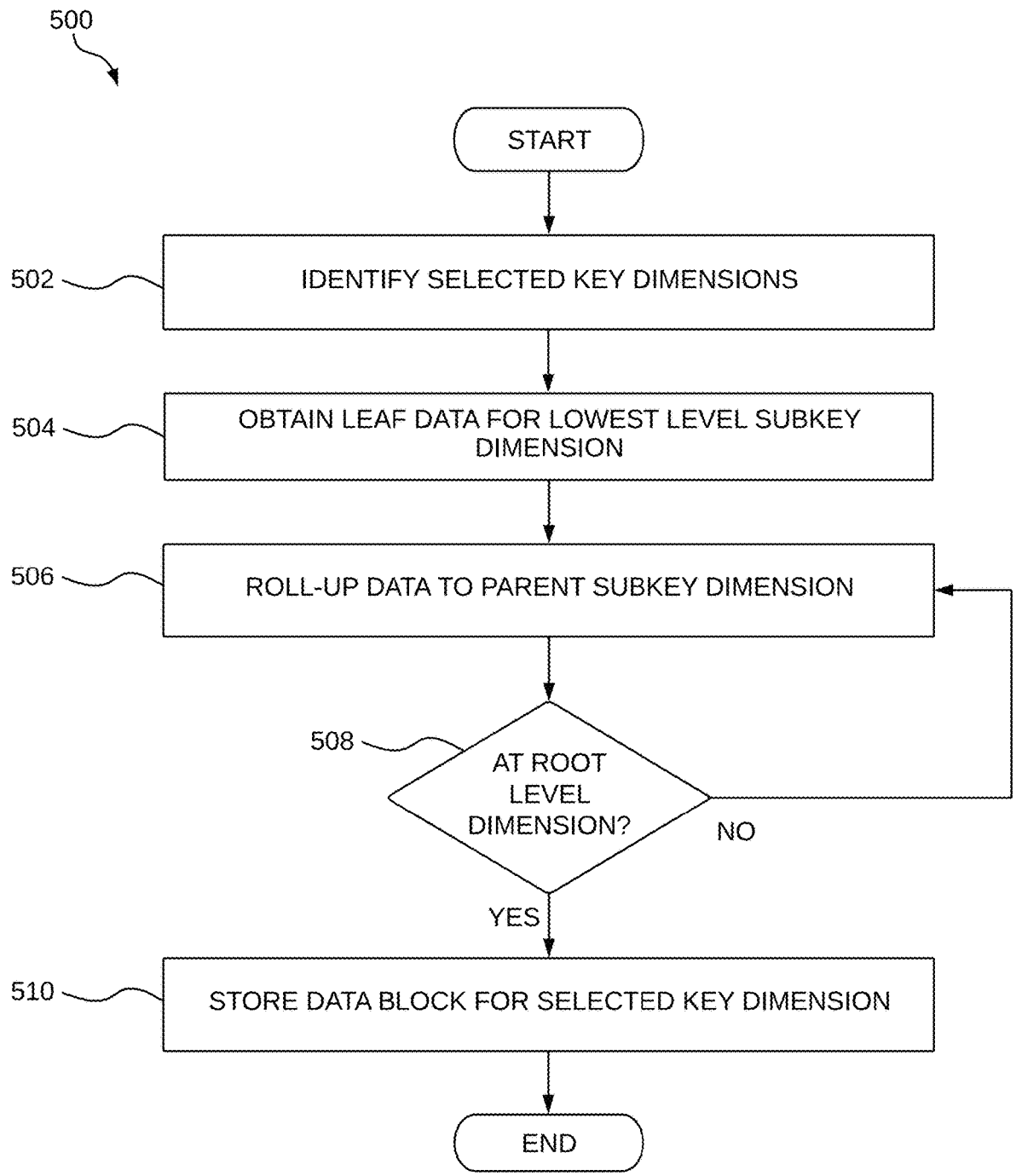
FIG. 5 is a flowchart of a method for subkey rollup operations in accordance with one aspect.

FIG. 5 is a flowchart of a method 500 for pre-aggregation processing during a first pass 110 in accordance with one aspect. For example, the method 500 is suitable for use as the processing performed at block 408 of the method 400. In one embodiment, method 500 is performed by the aggregation processing architecture 100 shown in FIG. 1.

Figure 6:
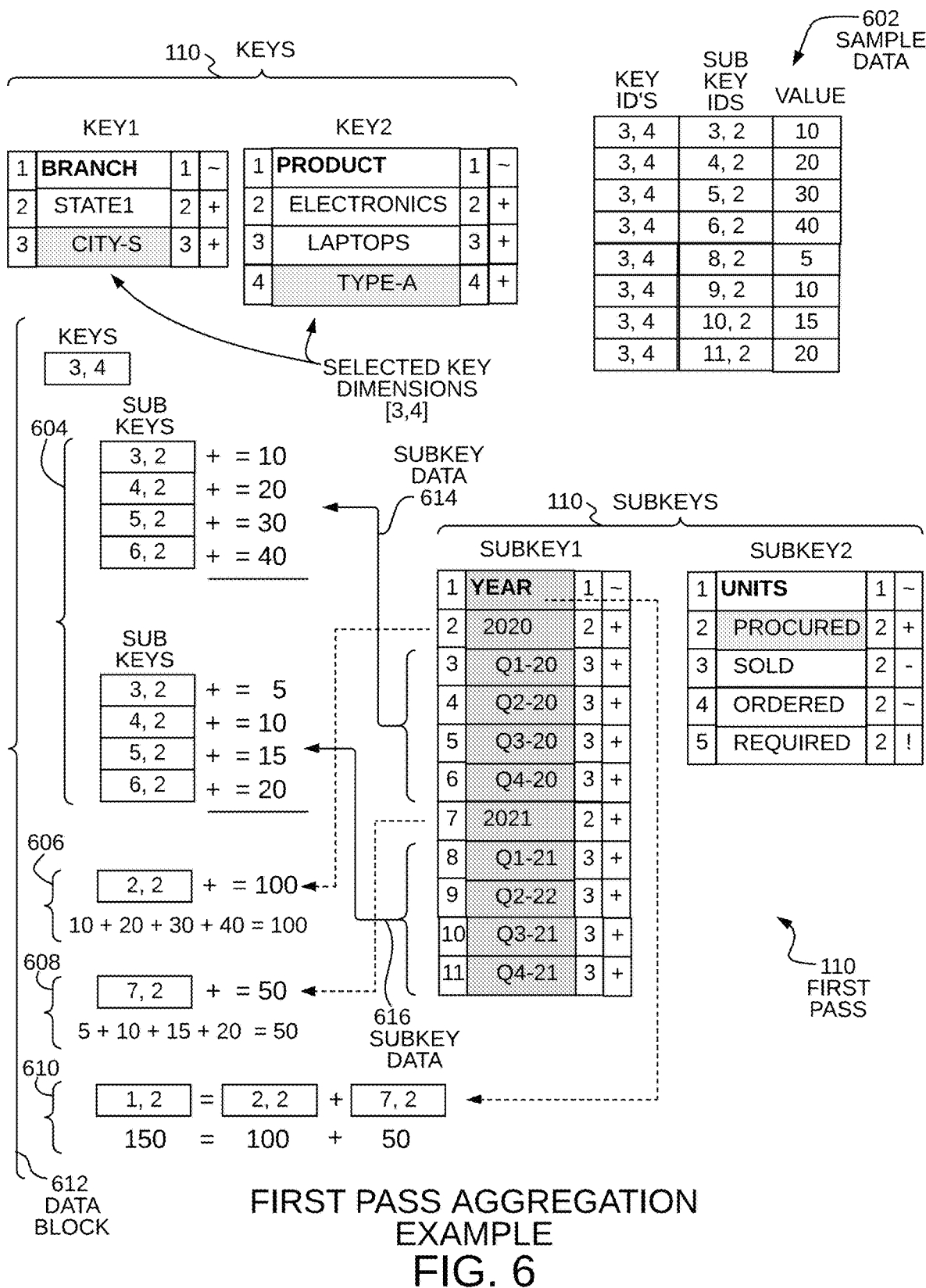
FIG. 6 shows a diagram that illustrates the operations of the method shown in FIG. 5.

FIG. 6 shows a diagram that illustrates the operations of the method 500 shown in FIG. 5 to aggregate sample data 602.

Referring now to FIG. 5, at block 502, selected key dimensions of the data are identified. For example, referring to FIG. 6, the key dimensions [3,4] are identified.

At block 504, leaf data for the lowest level subkey dimension is obtained. For example, as illustrated in FIG. 6, subkey data 614 and subkey data 616 are obtained as illustrated at 604 with the corresponding sample values.

At block 506, a data roll-up is performed to roll the obtained data up to the next level parent dimension. For example, for subkey data 614, the next level parent dimension is the year 2020 at dimension 2. The subkey data 614 is rolled up or aggregated according to the rollup operators (e.g., all+in this case) to obtain a rollup value of 100 for the year 2020. For example, the rollup 606 shows the rollup or aggregation for the subkey data 614 to determine the value of 100 for the year 2020.

Likewise, for subkey data 616, the next level parent dimension is the year 2021 at dimension 2. The subkey data 616 is rolled up or aggregated according to the rollup operators (e.g., all+in this case) to obtain a rollup value of 50 for the year 2021. For example, the rollup 608 shows the rollup or aggregation for the subkey data 616 to determine the value of 50 for the year 2021.

At block 508, a determination is made as to whether the aggregation has reached the root level dimension. If the aggregation has reached the root level dimension, then the method proceeds to block 510. If the aggregation has not reached the root level dimension, then the method proceeds to block 506.

When returning to block 506, the next level parent dimension is the Year at dimension 1. The subkey data 606 and 608 are rolled up or aggregated according to the rollup operators (e.g., all+in this case) to obtain a rollup value of 150 for the Year. For example, the rollup 610 shows the rollup or aggregation for the subkey data 606 and 608 to determine the value of 150 for the Year dimension at level 1. The method proceeds between the blocks 506 and 508 until the rollup reaches the root dimension.

At block 510, the block data is stored for the selected key dimension. For example, the keys [3,4] identify the data block 612 that is stored in memory.

Thus, method 500 operates to provide subkey aggregation in accordance with one aspect. It should be noted that the operations of method 500 can be updated, deleted, added to, rearranged or otherwise modified within the scope of the embodiments.

Figure 7:
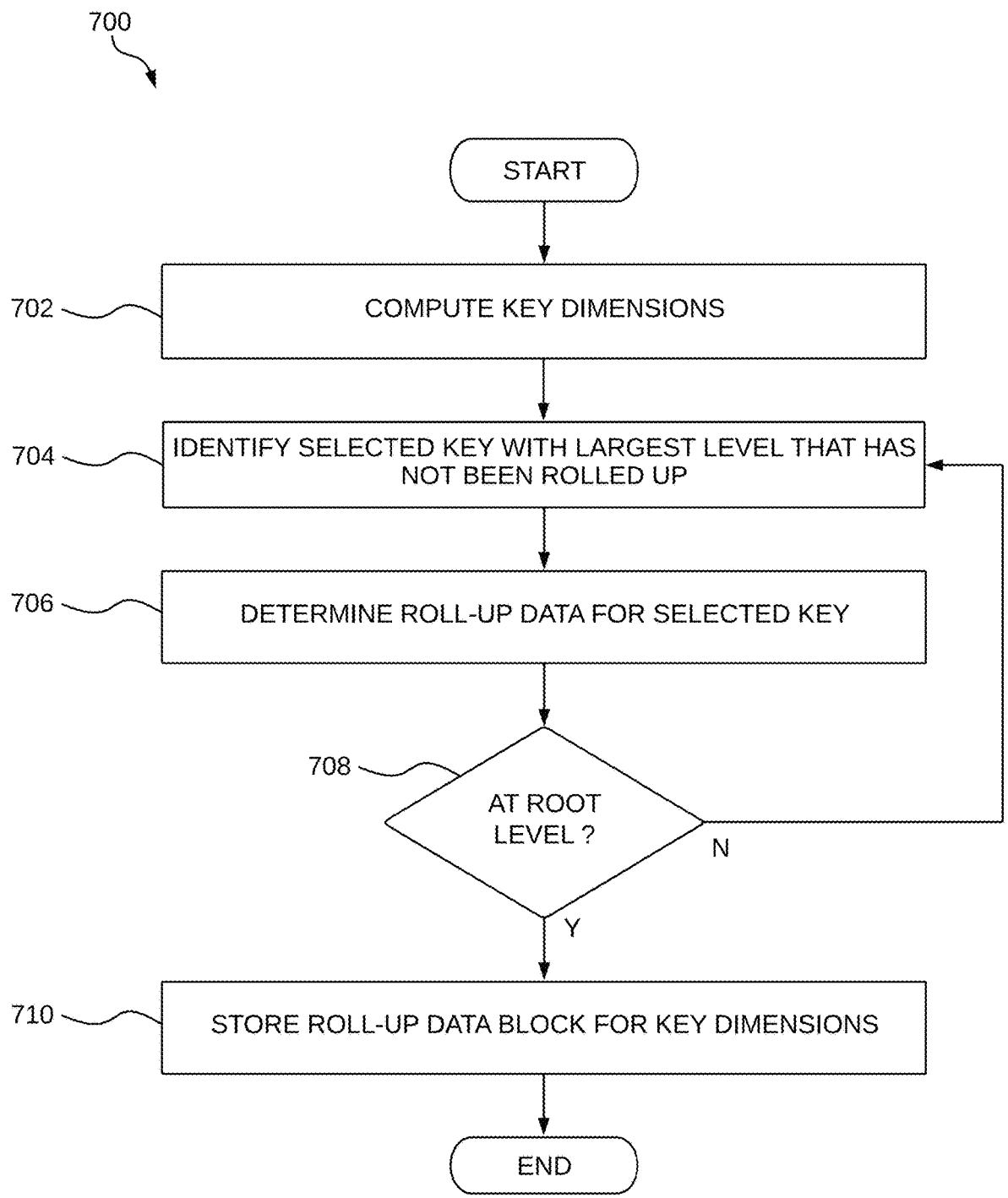
FIG. 7 is a flowchart of a method for key rollup operations in accordance with one aspect.

FIG. 7 is a flowchart of a method 700 for key aggregation processing during a second pass in accordance with one aspect. For example, method 700 is suitable for use as the processing performed at block 410 of method 400. In one embodiment, method 700 is performed by the aggregation processing architecture 100 shown in FIG. 1.

Figure 8:
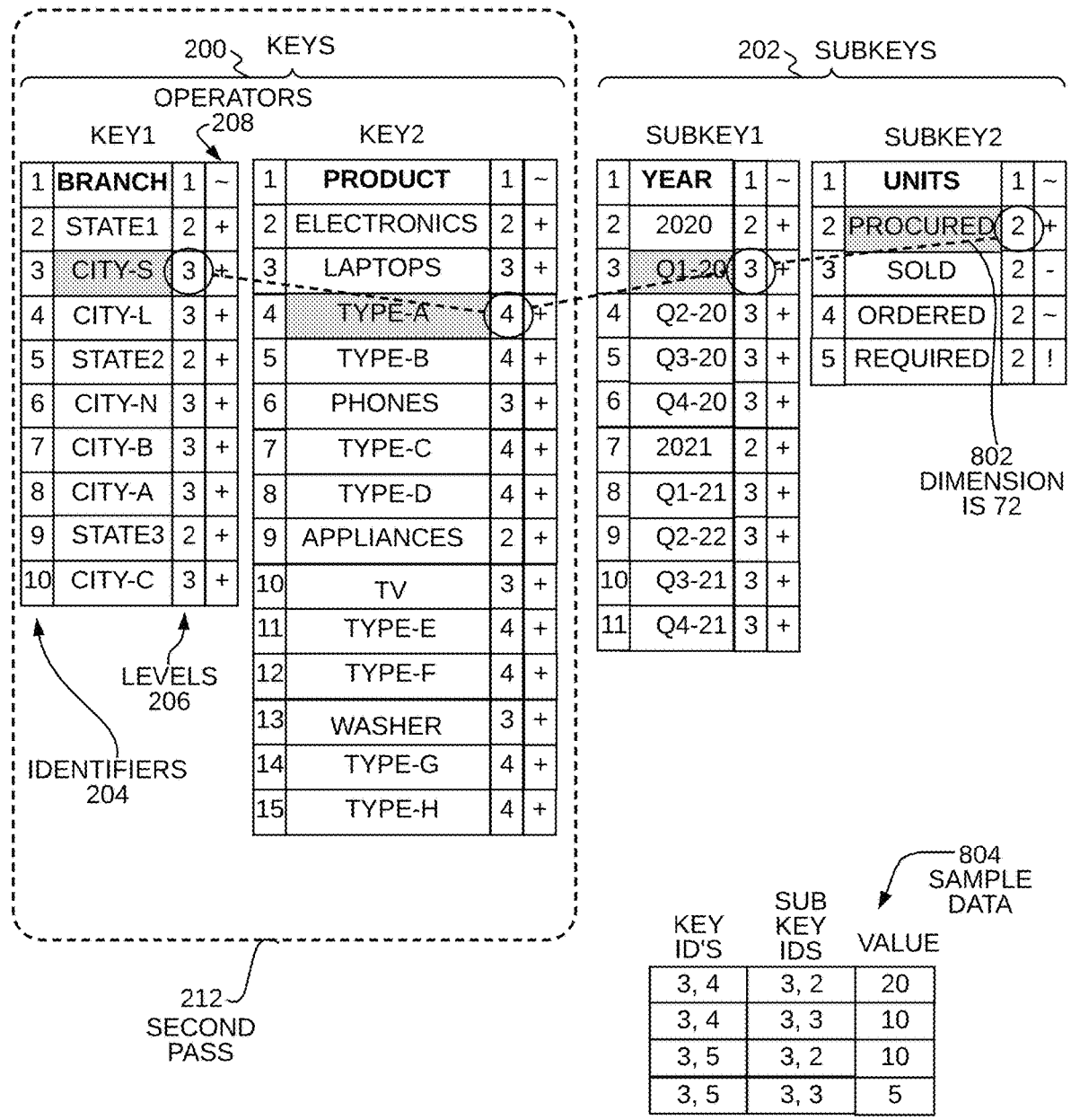

FIGS. 8-9 show diagrams that illustrate the operations of method 700 to provide key aggregation processing during a second pass. FIG. 8 also shows sample data 804 used to illustrate the operations of method 700.

Referring now to FIG. 7, at block 702, key dimension levels are computed. For example, the key dimensions are computed by multiplying together the levels of the key and subkey dimensions. For example, as illustrated in FIG. 8 at reference indicator 802, the levels for the key (CITY-S*TYPE-A*Q1-20*PROCURED) (e.g., 3*4*3*2) are multiplied together to obtain a value of 72. All such key dimensions are computed to obtain level values, which indicate which keys have the largest number of child keys.

At block 704, a selected key with the largest key level that has not been rolled up is determined. For example, the key (CITY-S*TYPE-A*Q1-20*PROCURED) with a level of 72 will be selected.

At block 706, a data roll-up is performed on the selected key. For example, for the sample data 804, the leaf data block aggregation is performed by generating all the roll-up keys for all leaf data key combinations using the bottom-up approach and simultaneously adds the leaf's value to the roll-up based on the operator.

For the first leaf data key combination shown at 902 in FIG. 9, the different combinations of roll-up keys and their corresponding values are shown at 904 in FIG. 9. Similarly, for the subsequent leaf data key combination shown at 906, the different combinations of roll-up keys and their corresponding values are shown at 908 in FIG. 9.

Also, there will be keys that are generated multiple times, formed by varying different dimensions. In such a case, the aggregation algorithm adds up the value only if the same dimension generates it. For example, for the leaf data combination shown at 910, the key will be generated from the combinations shown at 912 in FIG. 9.

The key value will be first generated from the keys at level 54. The value would be the same at both levels. Based on the execution levels, this process continues for all the data key combinations till the top node is processed. In the above example, the level for each dimension is calculated by multiplying the level of individual dimension members at their hierarchical level.

At block 708, a determination is made as to whether the key aggregation has reached the root level dimension. If the key aggregation has reached the root level dimension, then the method proceeds to block 710. If the aggregation has not reached the root level dimension, then the method proceeds to block 704.

At block 710, the rollup block data is stored for the selected key dimension. For example, in FIG. 6, the aggregation of the keys [3,4] generates the data block 612 that is stored in memory.

Thus, method 700 operates to provide key aggregation during a second pass in accordance with one aspect. It should be noted that the operations of method 700 can be updated, deleted, added to, rearranged or otherwise modified within the scope of the embodiments.

Figure 10:
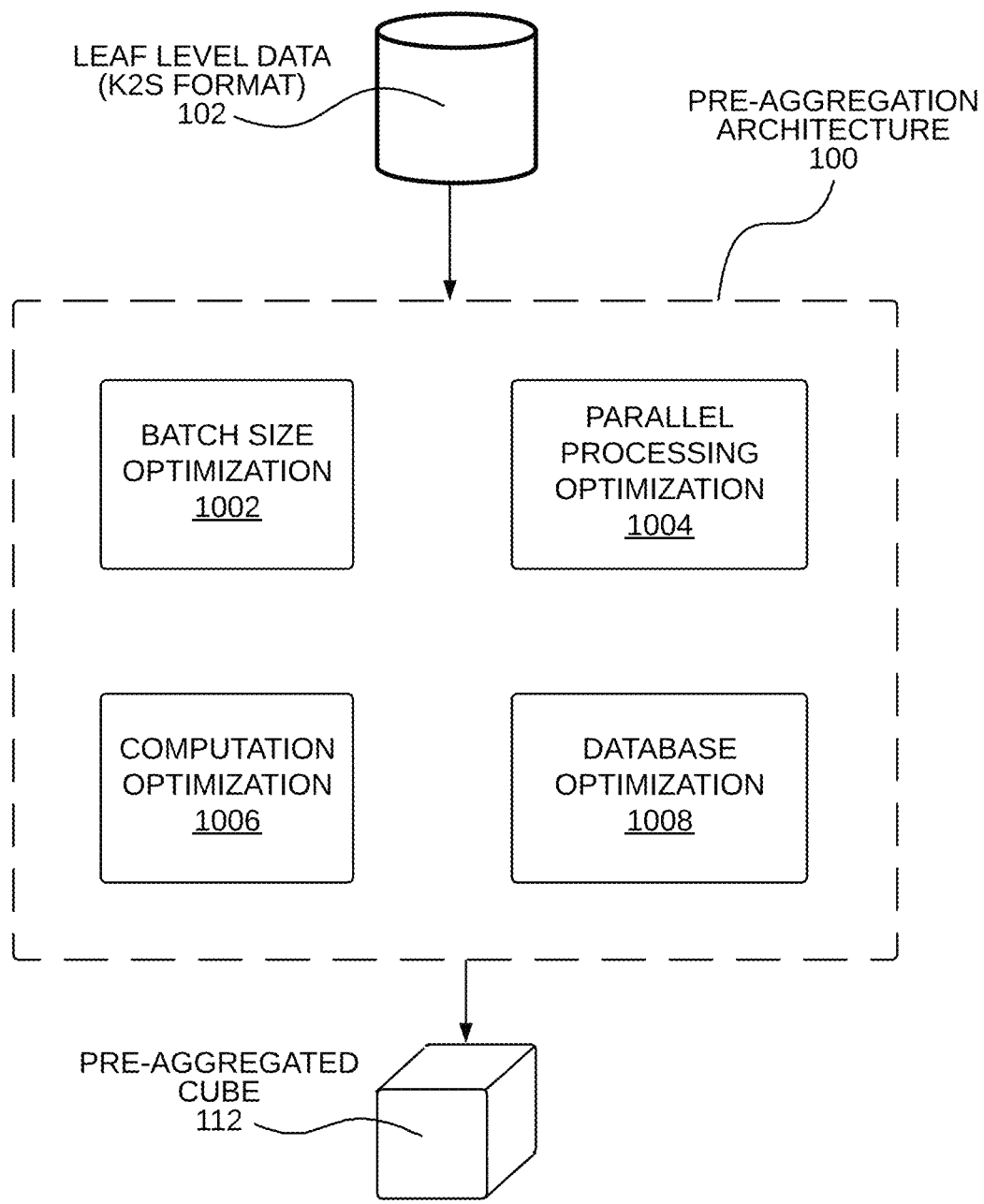
FIG. 10 shows exemplary technical improvements performed by embodiments of the pre-aggregation architecture shown in FIG. 1.

FIG. 10 shows exemplary technical improvements performed by embodiments of the pre-aggregation architecture 100 shown in FIG. 1. In one embodiment, the pre-aggregation architecture 100 receives leaf level data in K2S format 102 and generates pre-aggregated cube data 112. During operation, the architecture 100 provides technical improvements by performing batch size optimization 1002, parallel processing optimization 1004, computation optimization 1006, and database optimization 1008.

Figure 11:
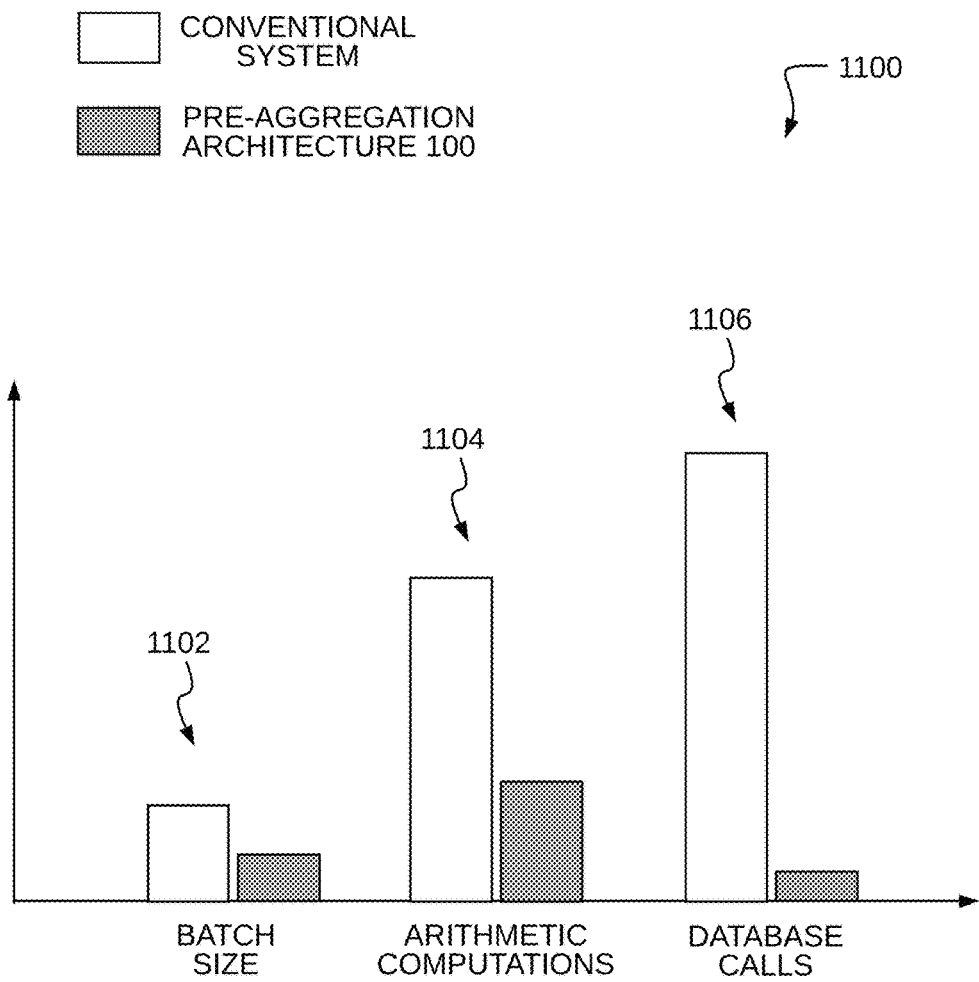
FIG. 11 shows a diagram that illustrates performance improvements provided by embodiments of the pre-aggregation architecture shown in FIG. 1.

FIG. 11 shows a diagram that illustrates performance improvements 1100 provided by embodiments of the pre-aggregation architecture 100 shown in FIG. 1. As illustrated in FIG. 11, the pre-aggregation architecture 100 provides for reduced batch size 1102, fewer arithmetic computations 1104, and far fewer database calls 1106 when compared to conventional systems. Thus, embodiments of the pre-aggregation architecture 100 provide significant performance improvements over conventional systems.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:
1. A method comprising:
receiving data formatted in a key/subkey format;
distributing a data batch of the data to a plurality of processing threads;
at each processing thread, performing operations of:
performing a first pass on the data batch to determine subkey rollup data, wherein the operation of performing the first pass comprises:
identifying selected key dimensions;
obtaining leaf data for a lowest level subkey dimension;
rolling up data to a parent subkey dimension; and
repeating the operations until a root dimension is reached;
performing a second pass on the data batch to determine key rollup data; and
storing the subkey rollup data and the key rollup data into data blocks; and
outputting the data blocks to form a pre-aggregated data cube.

2. A method comprising:
receiving data formatted in a key/subkey format;
distributing a data batch of the data to a plurality of processing threads;
   at each processing thread, performing operations of:
      performing a first pass on the data batch to determine subkey rollup data;
      performing a second pass on the data batch to determine key rollup data, wherein the operation of performing the second pass comprises:
         computing key levels;
         identifying selected key with largest level that has not been rolled up;
         determining roll-up data from the selected key; and
         repeating the operations until a root level is reached;
      storing the subkey rollup data and the key rollup data into data blocks; and
   outputting the data blocks to form a pre-aggregated data cube.

3. An apparatus configured to pre-aggregate data, the apparatus comprising:
an input interface to receive the data, wherein the data is formatted in key/subkey format;
a processor that processes a data batch of the data using a plurality of processing threads, wherein each processing thread performs operations of:
   performing a first pass on the data batch to determine subkey rollup data, wherein the processor performs the first pass by performing operations of:
      identifying selected key dimensions;
      obtaining leaf data for a lowest level subkey dimension;
      rolling up data to a parent subkey dimension; and
      repeating the operations until a root dimension is reached;
   performing a second pass on the data batch to determine key rollup data; and
   storing the subkey rollup data and the key rollup data into data blocks; and
an output memory for outputting the data blocks to form a pre-aggregated data cube.

4. An apparatus configured to pre-aggregate data, the apparatus comprising:
an input interface to receive the data, wherein the data is formatted in key/subkey format;
a processor that processes a data batch of the data using a plurality of processing threads, wherein each processing thread performs operations of:
   performing a first pass on the data batch to determine subkey rollup data;
   performing a second pass on the data batch to determine key rollup data, wherein the processor performs the second pass by performing operations of:
      computing key levels;
      identifying selected key with largest level that has not been rolled up;
      determining roll-up data from the selected key; and
      repeating the operations until a root level is reached; and
an output memory for outputting the data blocks to form a pre-aggregated data cube.

* * * * *